United States Patent
Guoqing

(10) Patent No.: US 8,078,183 B2
(45) Date of Patent: Dec. 13, 2011

(54) SYSTEM FOR WIRELESS CHANNEL ASSIGNMENT

(75) Inventor: Bao Guoqing, Xi'an (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 1422 days.

(21) Appl. No.: 11/561,976

(22) Filed: Nov. 21, 2006

(65) Prior Publication Data

US 2007/0293228 A1 Dec. 20, 2007

(30) Foreign Application Priority Data

Jun. 16, 2006 (CN) .......................... 2006 1 0087096

(51) Int. Cl.
*H04W 72/00* (2009.01)
*H04W 4/00* (2009.01)
(52) U.S. Cl. ......... 455/450; 455/509; 370/329; 370/341
(58) Field of Classification Search .......... 455/450–454, 455/507–526; 370/329, 341
See application file for complete search history.

(56) References Cited

U.S. PATENT DOCUMENTS

| 5,512,884 | A | 4/1996 | Hesse et al. |
| 2002/0173311 | A1 | 11/2002 | Biggs et al. |
| 2005/0141450 | A1 | 6/2005 | Carlton et al. |
| 2006/0007861 | A1 | 1/2006 | Kurzmann et al. |

FOREIGN PATENT DOCUMENTS

| CN | 1286584 A | 3/2001 |
| EP | 0923255 A2 | 6/1999 |
| WO | WO 2007/147314 A1 | 12/2007 |

OTHER PUBLICATIONS

Written Opinion of the International Searching Authority issued in corresponding PCT Patent Application No. PCT/CN2007/001300, mailed Aug. 2, 2007.
Extended European Search Report issued in corresponding European Patent Application No. 07252431.7, mailed Oct. 16, 2007.
European Communication issued in corresponding European Patent Application No. 07252431.7, mailed Apr. 18, 2008.
First Office Action issued in corresponding Chinese Patent Application No. 200780000282.3, mailed Sep. 3, 2010.
$3^{rd}$ Generation Partnership Project: Technical Specification Group GSM/EDGE Radio Access Network; Mobile Switching Centre—Base Station System (MSC-BSS) interface; Layer 3 specification (Release 7). 3GPP TS 48.008, V7.5.0, May 2006. pp. 6-9.
$3^{rd}$ Generation Partnership Project: Technical Specification Group GSM/EDGE Radio Access Network; Mobile Switching Centre—Base Station System (MSC-BSS) interface; Layer 3 specification (Release 7). 3GPP TS 48.008, V7.4.1, Feb. 2006.
$3^{rd}$ Generation Partnership Project: Technical Specification Group GSM/EDGE Radio Access Network; Mobile Switching Centre—Base Station System (MSC-BSS) interface; Layer 3 specification (Release 7). 3GPP TS 48.008, V7.5.0, May 2006.
Office Action issued in corresponding Chinese Patent Application No. 200880000282.3, mailed Jun. 9, 2011.

*Primary Examiner* — Matthew Sams
(74) *Attorney, Agent, or Firm* — Brinks Hofer Gilson & Lione

(57) ABSTRACT

A system for wireless channel assignment is disclosed, applying different assignment strategies to a plurality of nominated cells belonging to a Base Station Controller, particularly in A-interface link sharing. Channel assignment strategy information for the nominated cells is obtained, and communicated via communication messages. Channels are allocated for nominated cells according to the channel assignment strategy information communicated via the communication messages. Communication messages are structured to include channel assignment strategy information corresponding to each of the nominated cells.

15 Claims, 2 Drawing Sheets

SYSTEM FOR WIRELESS CHANNEL ASSIGNMENT

PRIORITY CLAIMED

The present invention claims priority of the patent application filed on Jun. 16, 2000 in P. R. of China, application No. 200610087096.5.

TECHNICAL FIELD OF THE INVENTION

The present invention relates generally to telecommunications, and more particularly, to a versatile system of structures and methods for wireless channel assignment.

BACKGROUND OF THE INVENTION

In conventional group call services, including Voice Group Call Service (VGCS) and Voice Broadcast Service (VBS), each nominated cell in a given call uses an independent A-interface circuit. However, when a group call involves numerous cells, initiation of the group call consumes a large amount of A-interface circuit resources.

Conventionally, there are two schemes for sharing the A-interface in group call services. A first scheme is to share an A-interface circuit. In this scheme, a Mobile Switching Center (MSC) independently sends an Assignment Request message for each of nominated cells. A Call Instance Code (CIC) in each Assignment Request message is the same, since all cells share one A-interface circuit. A second scheme is to share an A-interface link, in addition to the A-interface circuit. When an MSC sends an Assignment Request message, a list of all cells involved in a given group call is contained in the Assignment Request message. If the number of nominated cells is so large that the entire list of all cells does not fit into the Assignment Request message, the MSC will send one or more subsequent VGCS/VBS AREA CELL INFO messages, containing remaining list of the cells.

One CIC is used in the Assignment Request message. The Assignment Request message contains information that indicates wireless channel assignment strategies for nominated cells. However, cells that belong to one Base Station Controller (BSC) must use the same assignment strategy, regardless of user distribution in each cell.

Therefore, there is a need for a wireless channel assignment system, which saves A-interface resources, and accommodates user needs in nominated cells of a given group call.

SUMMARY OF THE INVENTION

Embodiments of the present invention provide a system for wireless channel assignment, comprising various constructs and methods that apply different assignment strategies to a plurality of nominated cells belonging to one Base Station Controller (BSC). The system obtains channel assignment strategy information for the nominated cells; communicates the channel assignment strategy information for the nominated cells via communication messages; and allocates channels for the nominated cells, according to the channel assignment strategy information communicated via the communication messages. Communication messages are structured to include channel assignment strategy information corresponding to each of the nominated cells. Certain embodiments sends multiple communication messages containing the channel assignment strategy information corresponding to nominated cells—where each type of nominated cells uses the same channel assignment strategy.

Embodiments of the present invention apply different wireless channel assignment strategies to different cells belonging to one BSC in A-interface link sharing. Thus A-interface resources are conserved, and the need of channels in different cells is accommodated, according to user distribution of the cells.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
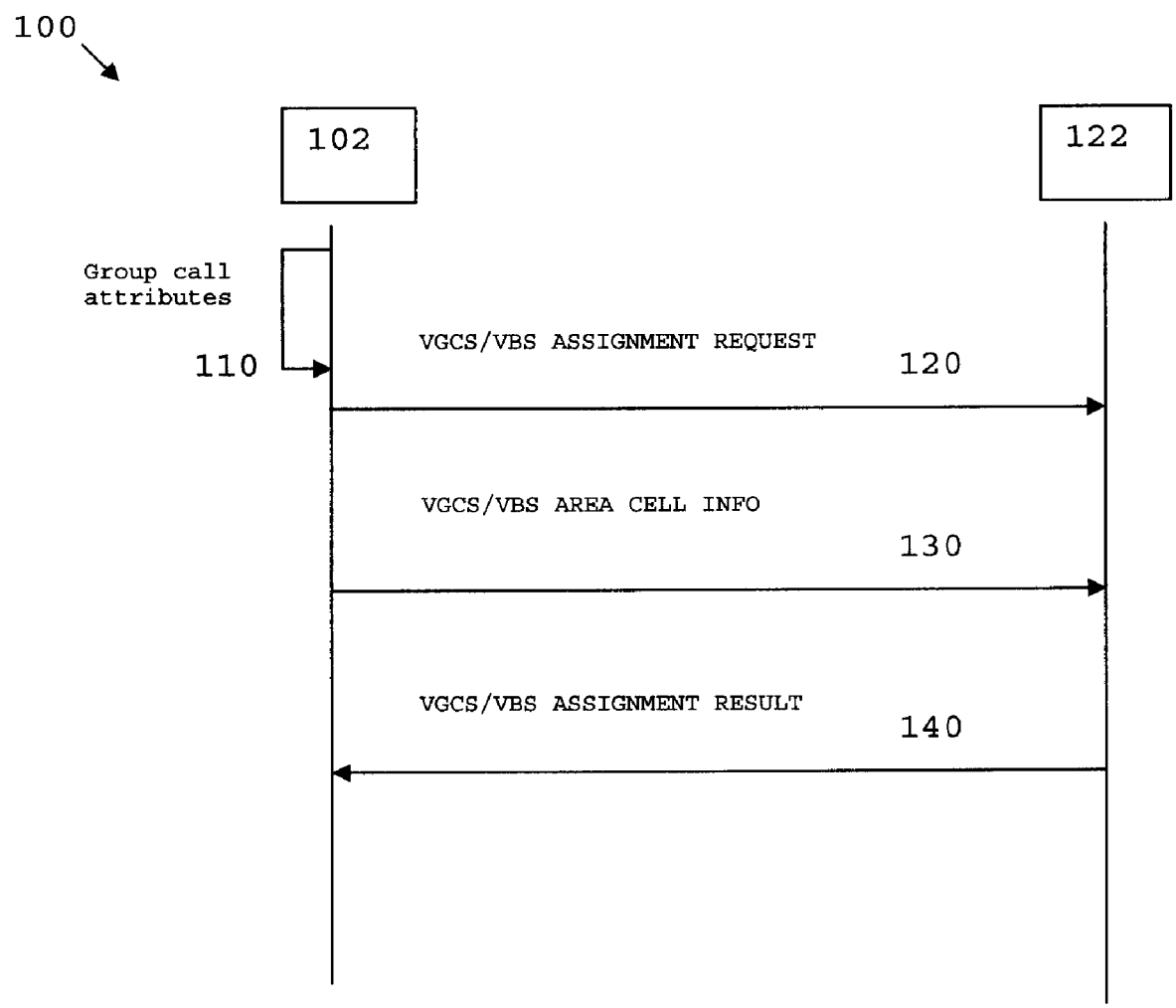
FIG. 1 is a diagram illustrating sequences of wireless channel assignment using AR Inds in Cell identification fields to indicate channel assignment strategies according to one embodiment of the present invention.

The following discussion is presented to enable a person skilled in the art to make and use the invention. The general principles described herein may be applied to embodiments and applications other than those detailed below without departing from the spirit and scope of the present invention as defined by the appended claims. The present invention is not intended to be limited to the embodiments shown, but is to be accorded the widest scope consistent with the principles and features disclosed herein.

In the most recent protocol 48008-741 of the $3^{rd}$ Generation Partnership Project (3GPP), a Voice Group Call Service (VGCS)/Voice Broadcast Service (VBS) ASSIGNMENT REQUEST message in A-interface link sharing is defined as in Table 1:

TABLE 1

| INFORMATION ELEMENT | REFERENCE | DIRECTION | TYPE | LEN |
|---|---|---|---|---|
| Message Type | 3.2.2.1 | MSC-BSS | M | 1 |
| Channel Type | 3.2.2.11 | MSC-BSS | M (note 2) | 5–13 |
| Assignment Requirement | 3.2.2.52 | MSC-BSS | M | 2 |
| Cell Identifier | 3.2.2.17 | MSC-BSS | M | 3–10 |
| Group Call Reference | 3.2.2.55 | MSC-BSS | M | 7 |
| Priority | 3.2.2.18 | MSC-BSS | O | 3 |
| Circuit Identity Code | 3.2.2.2 | MSC-BSS | O (note 2) | 3 |
| Downlink DTX Flag | 3.2.2.26 | MSC-BSS | O (note 2) | 2 |
| Encryption Information | 3.2.2.10 | MSC-BSS | O | 3–n |
| VSTK_RAND | 3.2.2.83 | MSC-BSS | O (note 1) | 7 |
| VSTK | 3.2.2.84 | MSC-BSS | O (note 1) | 18 |

TABLE 1-continued

| INFORMATION ELEMENT | REFERENCE | DIRECTION | TYPE | LEN |
|---|---|---|---|---|
| Cell Identifier List (only if segmentation is not used) | 3.2.2.27 | MSC-BSS | O (note 3) | 3 + 4 to 3 + 4n |
| Cell Identifier List Segment (only if segmentation is used) | 3.2.2.27a | MSC-BSS | O (note 3) | 4 + 4 to 4 + 4n |

NOTE
1: This information is included for ciphered VGCS/VBS calls.
NOTE
2: If A-interface circuit sharing is used for a given VGCS/VBS call, the MSC shall include the same value for the CIC, Channel Type and Downlink DTX flag in each VGCS/VBS ASSIGNMENT REQUEST message sent for this VGCS/VBS call to a specific Base Station Subsystem (BSS).
NOTE
3: In case of A-interface link sharing the Cell Identifier List or List Segment are included to identify the cells of the group call supported by this BSC.

The Assignment Requirement Information Element (IE) in Table 1 is defined in Table 2:

TABLE 2

| 8 | 7 | 6 | 5 | 4 | 3 | 2 | 1 | |
|---|---|---|---|---|---|---|---|---|
| | | | Element identifier | | | | | octet 1 |
| | | | Assignment requirement | | | | | octet 2 |

Octet 2 in Table 2 has the following values:

TABLE 3

| Value | Description |
|---|---|
| 00000000 | Delay allowed |
| 00000001 | Immediate and the resources shall not be de-allocated until the end of the call (channel establishment on demand forbidden by the MSC). |
| 00000010 | Immediate and the resources may further be de-allocated by the BSS (channel establishment on demand permitted by the MSC). |

All other values are reserved.

A Mobile Switching Center (MSC) controls VGCS/VBS radio resource allocation on demand to be enabled or disabled by including Assignment Requirement IE in a VGCS/VBS ASSIGNMENT REQUEST message. The MSC uses the Assignment Requirement IE to control whether a Base Station Subsystem (BSS) is allowed to de-allocate VGCS/VBS radio resources before the end of a call. The MSC uses the Assignment Requirement IE in the VGCS/VBS ASSIGNMENT REQUEST message to indicate wireless channel resource assignment strategy types.

One likely drawback of the conventional definition is that all cells belonging to one Base Station Controller (BSC) use the same wireless channel assignment strategy in A-interface link sharing.

Embodiments of the present invention recognize that different cells involved in a given group call should be able to use different wireless channel assignment strategies, since user distribution may vary from cell to cell. For example, for a cell in which group calls occur more frequently, an immediate assignment strategy may be used to assign channels for this cell; while for a cell in which group calls occur less frequently, a delayed assignment strategy may be used to conserve wireless channel resources.

Thus, embodiments of the present invention provide a system for wireless channel assignment that utilizes different wireless channel assignment strategies, for different cells belonging to one BSC, in A-interface link sharing. The embodiments provide A-interface link sharing compatible with conventional protocols. The embodiments restructure the VGCS/VBS ASSIGNMENT REQUEST message or VGCS/VBS AREA CELL INFO message, to contain channel assignment strategies for nominated cells in a given group call, optimizing system operation.

In embodiments of the present invention, the type of the Assignment Requirement IE in the VGCS/VBS ASSIGNMENT REQUEST message may be changed from M (mandatory) to O (Optional). New definitions to indicate assignment strategies may be added in Cell identification fields of the Cell Identifier IE, the Cell Identifier List IE, and the Cell Identifier List Segment IE, in the VGCS/VBS ASSIGNMENT REQUEST message and the VGCS/VBS AREA CELL INFO message.

Conventionally, the Cell Identifier IE, the Cell Identifier List IE and the Cell Identifier List Segment IE in 3GPP are defined as in the following Table 4, 5 and 6:

TABLE 4

| | | | Cell Identifier | | | | | |
|---|---|---|---|---|---|---|---|---|
| 8 | 7 | 6 | 5 | 4 | 3 | 2 | 1 | |
| | | | Element identifier | | | | | octet 1 |
| | | | Length | | | | | octet 2 |
| | Spare | | | Cell identification discriminator | | | | octet 3 |
| | | | Cell identification | | | | | octet 4–n |

TABLE 5

| | | | Cell Identifier List | | | | | |
|---|---|---|---|---|---|---|---|---|
| 8 | 7 | 6 | 5 | 4 | 3 | 2 | 1 | |
| | | | Element identifier | | | | | octet 1 |
| | | | Length | | | | | octet 2 |
| | Spare | | | Cell identification discriminator | | | | octet 3 |
| | | | Cell identification 1 | | | | | octet 4-4 + m |
| | | | ... | | | | | |
| | | | Cell identification n | | | | | ... to 4 + nm |

TABLE 6

| | | | Cell Identifier List Segment | | | | | |
|---|---|---|---|---|---|---|---|---|
| 8 | 7 | 6 | 5 | 4 | 3 | 2 | 1 | |
| | | | Element identifier | | | | | octet 1 |
| | | | Length | | | | | octet 2 |
| | Sequence Length | | | Sequence Number | | | | octet 3 |
| | Spare | | | Cell identification discriminator | | | | octet 4 |
| | | | Cell identification 1 | | | | | octet 5 |
| | | | ... | | | | | to |
| | | | Cell identification n | | | | | octet 4 + n4 |

Definition of the Cell identification discriminator is in Table 7:

TABLE 7

| Value | Description |
|---|---|
| 0000 | The whole Cell Global Identification, CGI, is used to identify the cells. |
| 0001 | Location Area Code, LAC, and Cell Identify, CI, is used to identify the cells. |

TABLE 7-continued

| Value | Description |
|---|---|
| 0010 | Cell Identity, CI, is used to identify the cells. |
| 0011 | No cell is associated with the transaction. |
| 0100 | Location Area Identification, LAI, is used to identify all cells within a Location Area. |
| 0101 | Location Area Code, LAC, is used to identify all cells within a location area. |
| 0110 | All cells on the BSS are identified. |
| 1000 | Intersystem Handover to UTRAN or cdma2000. PLMN-ID, LAC, and RNC-ID, are encoded to identify the target RNC. |
| 1001 | Intersystem Handover to UTRAN or cdma2000. The RNC-ID is coded to identify the target RNC. |
| 1010 | Intersystem Handover to UTRAN or cdma2000. LAC and RNC-ID are encoded to identify the target RNC. |

All other values are reserved. Values 0100, 0101 and 0110 are only applicable for page messages.

Definition of the Cell identification when Cell identification discriminator=0000 is: For GSM 900 and DCS 1800:

TABLE 8

| 1 | 7 | 6 | 5 | 4 | 3 | 2 | 1 | |
|---|---|---|---|---|---|---|---|---|
| | MCC dig 2 | | | | MCC dig 1 | | | octet x + 1 |
| 1 | 1 | 1 | 1 | | MCC dig 3 | | | octet x + 2 |
| | MNC dig 2 | | | | MNC dig 1 | | | octet x + 3 |
| | | | LAC | | | | | octet x + 4 |
| | | | LAC cont. | | | | | octet x + 5 |
| | | | CI value | | | | | octet x + 6 |
| | | | CI value cont | | | | | octet x + 7 |

For PCS 1900 for NA:

TABLE 9

| 8 | 7 | 6 | 5 | 4 | 3 | 2 | 1 | |
|---|---|---|---|---|---|---|---|---|
| | MCC dig 2 | | | | MCC dig 1 | | | octet x + 1 |
| | MNC dig 3 | | | | MCC dig 3 | | | octet x + 2 |
| | MNC dig 2 | | | | MNC dig 1 | | | octet x + 3 |
| | | | LAC | | | | | octet x + 4 |
| | | | LAC cont. | | | | | octet x + 5 |
| | | | CI value | | | | | octet x + 6 |
| | | | CI value cont | | | | | octet x + 7 |

Definition of the Cell identification when Cell identification discriminator=0001 is:

TABLE 10

| 8 | 7 | 6 | 5 | 4 | 3 | 2 | 1 | |
|---|---|---|---|---|---|---|---|---|
| | | | LAC | | | | | octet x + 1 |
| | | | LAC cont. | | | | | octet x + 2 |
| | | | CI value | | | | | octet x + 3 |
| | | | CI value cont | | | | | octet x + 4 |

Definition of the Cell identification when Cell identification discriminator=0010 is:

TABLE 11

| 8 | 7 | 6 | 5 | 4 | 3 | 2 | 1 | |
|---|---|---|---|---|---|---|---|---|
| | | | CI value | | | | | octet x + 1 |
| | | | CI value cont | | | | | octet x + 2 |

Embodiments of the present invention provide definitions to indicate assignment strategies in each of the Cell identification fields, and as a result, when Cell identification discriminator=0000, definition of the Cell identification may be changed to:

For GSM 900 and DCS 1800:

TABLE 12

| 8 | 7 | 6 | 5 | 4 | 3 | 2 | 1 | |
|---|---|---|---|---|---|---|---|---|
| | MCC dig 2 | | | | MCC dig 1 | | | octet x + 1 |
| 1 | 1 | 1 | 1 | | MCC dig 3 | | | octet x + 2 |
| | MNC dig 2 | | | | MNC dig 1 | | | octet x + 3 |
| | | | LAC | | | | | octet x + 4 |
| | | | LAC cont. | | | | | octet x + 5 |
| | | | CI value | | | | | octet x + 6 |
| | | | CI value cont | | | | | octet x + 7 |
| | | | Spare | | | | AR Ind | octet x + 8 |

For PCS 1900 for NA:

TABLE 13

| 8 | 7 | 6 | 5 | 4 | 3 | 2 | 1 | |
|---|---|---|---|---|---|---|---|---|
| | MCC dig 2 | | | | MCC dig 1 | | | octet x + 1 |
| | MNC dig 3 | | | | MCC dig 3 | | | octet x + 2 |
| | MNC dig 2 | | | | MNC dig 1 | | | octet x + 3 |
| | | | LAC | | | | | octet x + 4 |
| | | | LAC cont. | | | | | octet x + 5 |
| | | | CI value | | | | | octet x + 6 |
| | | | CI value cont | | | | | octet x + 7 |
| | | | Spare | | | | AR Ind | octet x + 8 |

When Cell identification discriminator=0001, definition of the Cell identification may be changed to:

TABLE 14

| 8 | 7 | 6 | 5 | 4 | 3 | 2 | 1 | |
|---|---|---|---|---|---|---|---|---|
| | | | LAC | | | | | octet x + 1 |
| | | | LAC cont. | | | | | octet x + 2 |
| | | | CI value | | | | | octet x + 3 |
| | | | CI value cont | | | | | octet x + 4 |
| | | | Spare | | | | AR Ind | octet x + 5 |

When Cell identification discriminator=0010, definition of the Cell identification may be changed to:

TABLE 15

| 8 | 7 | 6 | 5 | 4 | 3 | 2 | 1 | |
|---|---|---|---|---|---|---|---|---|
| | | | CI value | | | | | octet x + 1 |
| | | | CI value cont | | | | | octet x + 2 |
| | | | Spare | | | | AR Ind | octet x + 3 |

The AR Ind in above tables has the same definition as the Assignment Requirement IE in the VGCS/VBS ASSIGNMENT REQUEST message, and the AR Ind is defined as:

TABLE 16

| Value | Description |
|---|---|
| 00000000 | Delay allowed. |
| 00000001 | Immediate and the resources shall not be de-allocated until the end of the call (channel establishment on demand forbidden by the MSC). |

TABLE 16-continued

| Value | Description |
|---|---|
| 00000010 | Immediate and the resources may further be de-allocated by the BSS (channel establishment on demand permitted by the MSC). |

All other values are reserved.

After a BSC receives the VGCS/VBS ASSIGNMENT REQUEST or the VGCS/VBS AREA CELL INFO messages, if the AR Ind of a Cell identification therein has a valid value—that is, the AR Ind is 00000000, 00000001 or 00000010—then the BSC uses the value of the AR Ind to determine a wireless channel assignment strategy for a cell corresponding to the Cell identification. If the AR Ind is an invalid value, then the BSC uses the Assignment Requirement IE in the VGCS/VBS ASSIGNMENT REQUEST message to determine a wireless channel assignment strategy for this cell.

Referring now to FIG. 1, diagram (100) depicts sequences of wireless channel assignment, using AR Ind in Cell identification fields to indicate channel assignment strategies. An MSC (102) first acquires group call attribute information from a Group Call Register (GCR), and the information includes wireless channel assignment strategy types for each of the nominated cells in a given group call, as shown in Step (110). In Step (120), MSC (102) sends a VGCS/VBS ASSIGNMENT REQUEST message to a BSC (122), and indicates the values of AR Inds via Cell identification fields of the Cell Identifier List IE or the Cell Identifier List Segment IE therein. The VGCS/VBS ASSIGNMENT REQUEST message contains a list of all nominated cells in the group call. If there are too many cells, and the VGCS/VBS ASSIGNMENT REQUEST message can not contain the entire list of all nominated cells, MSC (102) sends a VGCS/VBS AREA CELL INFO message containing the rest of the cell list. In this case, as shown in Step (130), MSC (102) sends a VGCS/VBS AREA CELL INFO message to BSC (122), indicating the values of AR Inds via Cell identification fields in a Cell Identifier List Segment IE therein. In Step (140), BSC (122) allocates a wireless channel for each of the nominated cells, using the assignment strategy indicated through the value of a corresponding AR Ind, and returns the VGCS/VBS ASSIGNMENT RESULT to MSC (102). Thus, different wireless channel assignment strategies are applied to different cells belonging to a single BSC.

Alternative embodiments provide a flow of the A-interface link sharing that remains substantially unchanged. The Assignment Requirement IE in a VGCS/VBS ASSIGNMENT REQUEST message is a mandatory (M) information element. In these embodiments, an Assignment Requirement IE, which is mandatory (M), may be added into a VGCS/VBS AREA CELL INFO message, to indicate assignment strategies of nominated cells contained in the VGCS/VBS AREA CELL INFO message, as shown in the following:

TABLE 17

| INFORMATION ELEMENT | REFERENCE | DIRECTION | TYPE | LEN |
|---|---|---|---|---|
| Message Type | 3.2.2.1 | MSC-BSS | M | 1 |
| Cell Identifier List Segment | 3.2.2.27a | MSC-BSS | M | 4 + 4 to 4 + 4n |
| Assignment Requirement | 3.2.2.52 | MSC-BSS | M | 2 |

Then when an MSC is sending to a BSC a VGCS/VBS ASSIGNMENT REQUEST message, it divides nominated cells belonging to a BSC involved in a given group call into three classes, according to channel assignment strategy type of each nominated cell, which is configured by the GCR in the list of cells. Each class of cells corresponds to one channel assignment strategy. The three classes of cells relate to three types of assignment strategies, which are defined the same as the Assignment Requirement IE in Table 3. The three classes of cells are shown in Table 18:

TABLE 18

| Value | Description |
|---|---|
| 00000000 | Delay allowed. |
| 00000001 | Immediate and the resources shall not be de-allocated until the end of the call (channel establishment on demand forbidden by the MSC). |
| 00000010 | Immediate and the resources may further be de-allocated by the BSS (channel establishment on demand permitted by the MSC). |

If there is only one assignment strategy type for all nominated cells belonging to a BSC, and if one VGCS/VBS ASSIGNMENT REQUEST message can contain the entire list of all the cells, then the MSC sends to the BSC a VGCS/VBS ASSIGNMENT REQUEST message. The Cell Identifier List IE in the VGCS/VBS ASSIGNMENT REQUEST message contains the entire list of all the cells belonging to the BSC, and the Assignment Requirement IE in the VGCS/VBS ASSIGNMENT REQUEST message indicates the assignment strategy of all the cells contained in the Cell Identifier List IE.

If there are multiple assignment strategies for all nominated cells belonging to a BSC, the MSC first uses a VGCS/VBS ASSIGNMENT REQUEST message to contain cells using one of the assignment strategies, and indicates the assignment strategy via the Assignment Requirement IE in the VGCS/VBS ASSIGNMENT REQUEST message. The second type of cells are contained in a VGCS/VBS AREA CELL INFO message, and the assignment strategy is indicated by the newly added Assignment Requirement IE, which is mandatory (M), in the VGCS/VBS AREA CELL INFO message. If there is a third type of assignment strategy, another VGCS/VBS AREA CELL INFO message is used to contain cells using the third assignment strategy.

For cells with the same assignment strategy, if the entire list of the cells does not fit into a VGCS/VBS ASSIGNMENT REQUEST message or a VGCS/VBS AREA CELL INFO message, then additional VGCS/VBS AREA CELL INFO messages containing the remaining cell list may be sent out.

Figure 2:
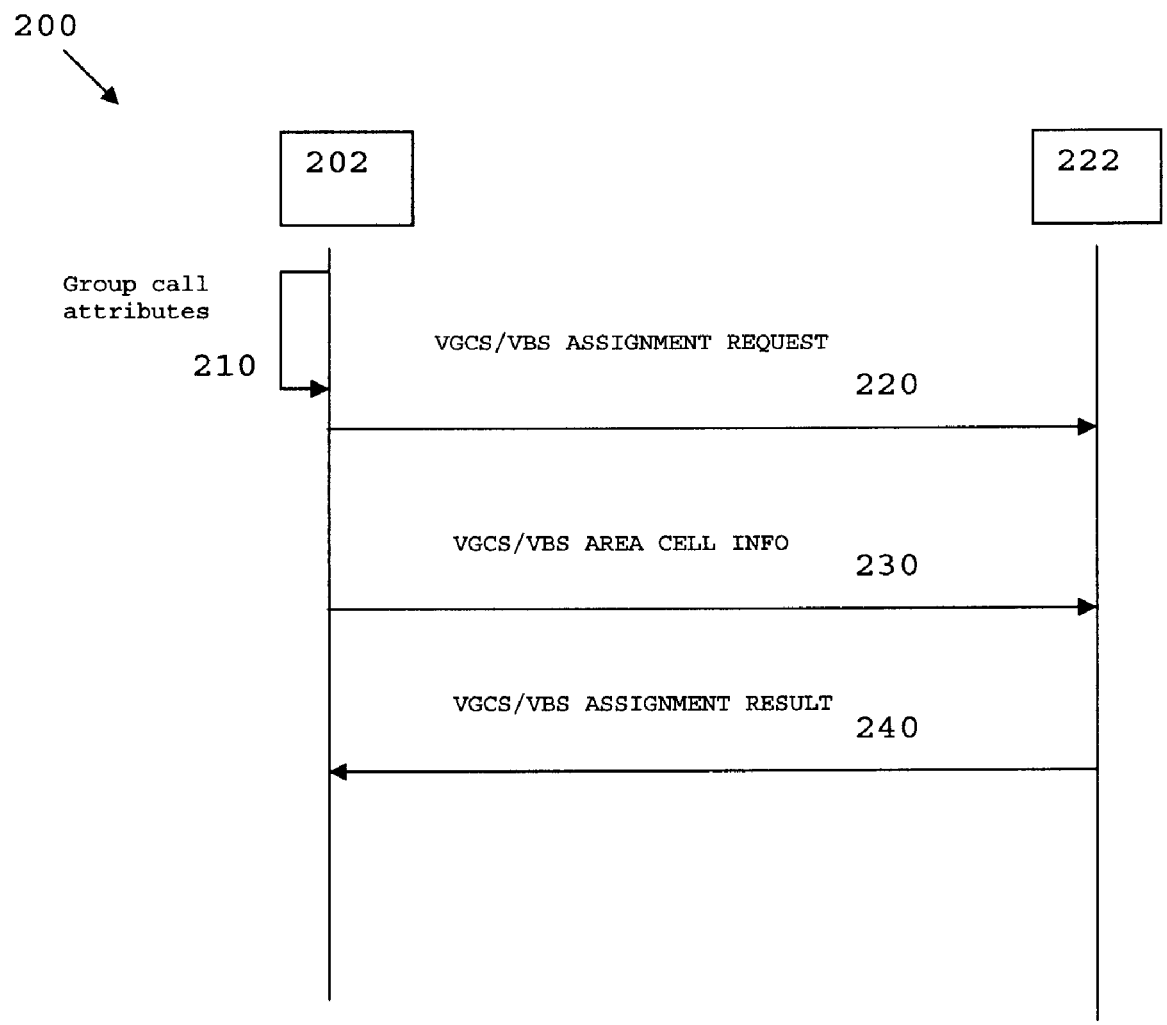
FIG. 2 is a diagram illustrating sequences of wireless channel assignment using Assignment Requirement information element in VGCS/VBS AREA CELL INFO messages to indicate channel assignment strategies according to one embodiment of the present invention.

Reference is now made to a diagram (200) of FIG. 2. Diagram (200) depicts sequences of using Assignment Requirement IE in a VGCS/VBS AREA CELL INFO message to indicate channel assignment strategies. An MSC (202) first acquires group call attribute information from a Group Call Register (GCR), and the information includes wireless channel assignment type for each cell, as shown in Step (210). In Step (220) MSC (202) sends a VGCS/VBS ASSIGNMENT REQUEST message to a BSC (222), indicating assignment type of all the cells contained in the VGCS/VBS ASSIGNMENT REQUEST message via the Assignment Requirement IE therein. If there are too many cells, and the entire list of the cells can not fit into the VGCS/VBS ASSIGNMENT REQUEST message, a VGCS/VBS AREA CELL INFO message may be sent containing the rest of the cells. In this case, as shown in Step (230), MSC (202) sends a VGCS/VBS AREA CELL INFO message to BSC (222), indicating the assignment type of all the cells contained in the VGCS/VBS AREA CELL INFO message, via the Assignment Requirement IE in the VGCS/VBS AREA CELL INFO message. In Step (240), BSC (222) allocates wireless channel resources according to the assignment strategy indicated by the Assignment Requirement IE, in the VGCS/VBS ASSIGNMENT REQUEST message and VGCS/VBS AREA CELL INFO message, respectively, and returns the VGCS/VBS ASSIGNMENT RESULT to MSC (202).

Another embodiment of wireless channel assignment provides an Assignment Requirement IE, which is mandatory, and which may be added into a VGCS/VBS AREA CELL INFO message, to indicate channel assignment strategy type for each of the nominated cells contained in the VGCS/VBS AREA CELL INFO message, as shown in the following:

TABLE 19

| INFORMATION ELEMENT | REFERENCE | DIRECTION | TYPE | LEN |
|---|---|---|---|---|
| Message Type | 3.2.2.1 | MSC-BSS | M | 1 |
| Cell Identifier List Segment | 3.2.2.27a | MSC-BSS | M | 4 + 4 to 4 + 4n |
| Assignment Requirement | 3.2.2.52 | MSC-BSS | M | 2 + m/4 m is the number of cells contained in the Cell Identifier List Segment IE |

The original structure of the Assignment Requirement IE in a VGCS/VBS ASSIGNMENT REQUEST message is:

TABLE 20

| 8 | 7 | 6 | 5 | 4 | 3 | 2 | 1 | |
|---|---|---|---|---|---|---|---|---|
| | | | Element identifier | | | | | octet 1 |
| | | | Assignment requirement | | | | | octet 2 |

In this embodiment, the structure of the Assignment Requirement IE in the VGCS/VBS ASSIGNMENT REQUEST message and the VGCS/VBS AREA CELL INFO message may be changed to:

TABLE 21

| 8 | 7 | 6 | 5 | 4 | 3 | 2 | 1 | |
|---|---|---|---|---|---|---|---|---|
| | | | Element identifier | | | | | octet 1 |
| | | | Length | | | | | octet 2 |
| AR Ind4 | | AR Ind3 | | AR Ind2 | | AR Ind1 | | octet 3 |
| | | | | | | | | ... |
| | | 1 | | 1 | | AR Indm | | octet n |

The Element identifier field is the same as defined in the Assignment Requirement IE of conventional protocols, Length is the length of the subsequent data in the Assignment Requirement IE, and AR Ind has the same definition as the conventional Assignment Requirement IE. The AR Ind takes the following values:

TABLE 22

| Value | Description |
|---|---|
| 00000000 | Delay allowed. |
| 00000001 | Immediate and the resources shall not be de-allocated until the end of the call (channel establishment on demand forbidden by the MSC). |
| 00000010 | Immediate and the resources may further be de-allocated by the BSS (channel establishment on demand permitted by the MSC). |

The AR Ind1, AR Ind2, AR Ind3, ... and AR Indm indicate channel assignment strategy type for cell 1, 2, ... and m. If any of the AR Inds shows a value of 11, it means that there is no other cells after this cell. The number of cells in the cell list contained in the VGCS/VBS ASSIGNMENT REQUEST message or the VGCS/VBS AREA CELL INFO message is consistent with the valid number of the AR Inds therein. Furthermore, the order of cells in the cell list contained in the VGCS/VBS ASSIGNMENT REQUEST message or the VGCS/VBS AREA CELL INFO message is in correspondence to that of the AR Inds therein. That is, AR Ind1 corresponds to the assignment strategy type of the first cell in the cell list, AR Ind2 corresponds to the assignment strategy type of the second cell in the cell list, and AR Indm corresponds to the assignment type of the $m^{th}$ cell in the cell list.

The first of such embodiments modifies the structure of the Cell identification field. The second of such embodiments is downwardly compatible with the original flow of A-interface link sharing. The third of such embodiments modifies the structure of the Assignment Requirement IE.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of wireless channel assignment, applying different assignment strategies to a plurality of nominated cells belonging to a Base Station Controller, comprising:
   obtaining channel assignment strategy information for the plurality of nominated cells;
   communicating channel assignment strategy information for the plurality of nominated cells via at least one communication message; and
   allocating channels for the plurality of nominated cells according to channel assignment strategy information communicated via the at least one communication message;
   wherein the at least one communication message comprises a Voice Group Call Service/Voice Broadcast Service ASSIGNMENT REQUEST message and a Voice Group Call Service/Voice Broadcast Service AREA CELL INFO message;
   wherein an information element of Assignment Requirement in the Voice Group Call Service/Voice Broadcast Service ASSIGNMENT REQUEST message has an optional type;

wherein Cell Identifier, Cell Identifier List and Cell Identifier List Segment information elements, in the Voice Group Call Service/Voice Broadcast Service ASSIGNMENT REQUEST message, or in the Voice Group Call Service/Voice Broadcast Service AREA CELL INFO message, comprise a plurality of fields which indicate channel assignment strategy information for each of the plurality of nominated cells;

wherein a channel assignment strategy indication field, AR Ind, is provided in each Cell identification field of Cell Identifier, Cell Identifier List, and Cell Identifier List Segment information elements, in the Voice Group Call Service/Voice Broadcast Service ASSIGNMENT REQUEST message, or in the Voice Group Call Service/ Voice Broadcast Service AREA CELL INFO message, to indicate channel assignment strategy information for each of the plurality of nominated cells.

2. The method of wireless channel assignment in claim 1, wherein the AR Ind has the same definition as the Assignment Requirement information element in the Voice Group Call Service/Voice Broadcast Service ASSIGNMENT REQUEST message.

3. The method of wireless channel assignment in claim 1, wherein channels are allocated to the plurality of nominated cells using channel assignment strategies indicated by the AR Inds if the AR Inds have valid values.

4. The method of wireless channel assignment in claim 1, wherein channels are allocated to the plurality of nominated cells using channel assignment strategies indicated by the Assignment Requirement information element in the Voice Group Call Service/Voice Broadcast Service ASSIGNMENT REQUEST message if the AR Inds have invalid values.

5. A method of wireless channel assignment, applying different assignment strategies to a plurality of nominated cells belonging to a Base Station Controller, comprising:
   obtaining channel assignment strategy information for the plurality of nominated cells;
   communicating channel assignment strategy information for the plurality of nominated cells via at least one communication message; and
   allocating channels for the plurality of nominated cells according to channel assignment strategy information communicated via the at least one communication message;
   wherein the at least one communication message comprises a Voice Group Call Service/Voice Broadcast Service ASSIGNMENT REQUEST message and a Voice Group Call Service/Voice Broadcast Service AREA CELL INFO message;
   wherein an Assignment Requirement information element, which is mandatory, is provided in a Voice Group Call Service/Voice Broadcast Service AREA CELL INFO message to indicate channel assignment strategy information for cells contained in the Voice Group Call Service/Voice Broadcast Service AREA CELL INFO message;
   wherein the plurality of nominated cells are classified into multiple types, and each type uses a corresponding type of channel assignment strategy;
   wherein the plurality of nominated cells use, at most, three types of channel assignment strategies; wherein channels are allocated for the plurality of nominated cells using channel assignment strategy information contained in multiple communication messages, if there are multiple channel assignment strategies for the plurality of nominated cells, and wherein:

a first type of the plurality of nominated cells is contained in a Voice Group Call Service/Voice Broadcast Service ASSIGNMENT REQUEST message, and a first type of the channel assignment strategies corresponding to the first type of the plurality of nominated cells is indicated by the Assignment Requirement information element therein;

a second type of the plurality of nominated cells is contained in a first Voice Group Call Service/Voice Broadcast Service AREA CELL INFO message, and a second type of channel assignment strategies corresponding to the second type of the plurality of nominated cells is indicated by the Assignment Requirement information element therein; and a third type of the plurality of nominated cells is contained in a second Voice Group Call Service/Voice Broadcast Service AREA CELL INFO message, and a third type of channel assignment strategies corresponding to the third type of the plurality of nominated cells is indicated by the Assignment Requirement information element therein.

6. The method of wireless channel assignment in claim 5, wherein multiple communication messages are sent, each containing one type of the plurality of nominated cells.

7. The method of wireless channel assignment in claim 5, wherein channels are allocated for the plurality of nominated cells using channel assignment strategy information indicated by the Assignment Requirement information element in a Voice Group Call Service/Voice Broadcast Service ASSIGNMENT REQUEST message, if there is only one type of channel assignment strategy for all the plurality of nominated cells, and the entire list of the plurality of nominated cells fits into the Voice Group Call Service/Voice Broadcast Service ASSIGNMENT REQUEST message.

8. The method of wireless channel assignment in claim 5, wherein if, a list of the plurality of nominated cells, using the same type of channel assignment strategy, does not fit into a Voice Group Call Service/Voice Broadcast Service ASSIGNMENT REQUEST message, then additional Voice Group Call Service/Voice Broadcast Service AREA CELL INFO messages are sent containing the remaining list of cells.

9. The method of wireless channel assignment in claim 5, wherein if, a list of the plurality of nominated cells, using the same type of channel assignment strategy, does not fit into a Voice Group Call Service/Voice Broadcast Service AREA CELL INFO message, then additional Voice Group Call Service/Voice Broadcast Service AREA CELL INFO messages are sent containing the remaining list of cells.

10. The method of wireless channel assignment in claim 5, wherein the Assignment Requirement information elements in the Voice Group Call Service/Voice Broadcast Service ASSIGNMENT REQUEST message, and the Voice Group Call Service/Voice Broadcast Service AREA CELL INFO message comprise at least one field to indicate different channel assignment strategies for the plurality of nominated cells.

11. A method of wireless channel assignment, applying different assignment strategies to a plurality of nominated cells belonging to a Base Station Controller, comprising:
   obtaining channel assignment strategy information for the plurality of nominated cells;
   communicating channel assignment strategy information for the plurality of nominated cells via at least one communication message; and allocating channels for the plurality of nominated cells according to channel assignment strategy information communicated via the at least one communication message;

wherein the at least one communication message comprises a Voice Group Call Service/Voice Broadcast Service ASSIGNMENT REQUEST message and a Voice Group Call Service/Voice Broadcast Service AREA CELL INFO message;

wherein an Assignment Requirement information element, which is mandatory, is provided in a Voice Group Call Service/Voice Broadcast Service AREA CELL INFO message to indicate channel assignment strategy information for cells contained in the Voice Group Call Service/Voice Broadcast Service AREA CELL INFO message;

wherein the Assignment Requirement information elements in the Voice Group Call Service/Voice Broadcast Service ASSIGNMENT REQUEST message, and the Voice Group Call Service/Voice Broadcast Service AREA CELL INFO message comprise:

a field, Length, indicating the number of the nominated cells contained in the Voice Group Call Service/Voice Broadcast Service ASSIGNMENT REQUEST message, and the Voice Group Call Service/Voice Broadcast Service AREA CELL INFO message, respectively;

a plurality of fields, AR Inds, indicating channel assignment strategy for each of the nominated cells contained in the Voice Group Call Service/Voice Broadcast Service ASSIGNMENT REQUEST message, and the Voice Group Call Service/Voice Broadcast Service AREA CELL INFO message, respectively; and wherein the number and order of the plurality of fields is consistent with the number and order of the nominated cells contained in the Voice Group Call Service/Voice Broadcast Service ASSIGNMENT REQUEST message, and the Voice Group Call Service/Voice Broadcast Service AREA CELL INFO message, respectively.

12. The method of wireless channel assignment in claim 11, wherein a value is set for an AR Ind to indicate the end of nominated cells contained in a Voice Group Call Service/Voice Broadcast Service ASSIGNMENT REQUEST message, or in a Voice Group Call Service/Voice Broadcast Service AREA CELL INFO message.

13. The method of wireless channel assignment in claim 12, wherein the value is 11.

14. A method of wireless channel assignment, for applying different assignment strategies to a plurality of nominated cells belonging to a Base Station Controller, in A-interface link sharing, comprising:

obtaining channel assignment strategy information for the plurality of nominated cells;

communicating channel assignment strategy information for the plurality of nominated cells via a Voice Group Call Service/Voice Broadcast Service ASSIGNMENT REQUEST message, or at least one Voice Group Call Service/Voice Broadcast Service AREA CELL INFO message, wherein the type of an information element—Assignment Requirement in the Voice Group Call Service/Voice Broadcast Service ASSIGNMENT REQUEST message, is optional;

wherein a channel assignment strategy indication field, AR Ind, is provided in each Cell identification field of Cell Identifier, Cell Identifier List, and Cell Identifier List Segment information elements, in the Voice Group Call Service/Voice Broadcast Service ASSIGNMENT REQUEST message and the at least one Voice Group Call Service/Voice Broadcast Service AREA CELL INFO message, to indicate channel assignment strategy information for each of the plurality of nominated cells; and allocating channels for the plurality of nominated cells, wherein channel assignment strategies indicated by AR Inds are used when AR Inds have valid values, and channel assignment strategies indicated by the Assignment Requirement information element in the Voice Group Call Service/Voice Broadcast Service ASSIGNMENT REQUEST message are used when AR Inds have invalid values.

15. The method of wireless channel assignment in claim 14, wherein the AR Ind has the same definition as the Assignment Requirement information element in the Voice Group Call Service/Voice Broadcast Service ASSIGNMENT REQUEST message.

* * * * *